United States Patent
Geiger

[11] 3,883,496
[45] May 13, 1975

[54] PROCESS FOR THE MANUFACTURE OF INSULIN, ANALOGS AND DERIVATIVES THEREOF

[75] Inventor: Rolf Geiger, Frankfurt am Main, Germany

[73] Assignee: Hoechst Aktiengesellschaft, Frankfurt (Main), Germany

[22] Filed: Oct. 23, 1973

[21] Appl. No.: 408,913

[30] Foreign Application Priority Data
Oct. 25, 1972 Germany............................ 2252157

[52] U.S. Cl. ............................................. 260/112.7
[51] Int. Cl. ..................... A61k 17/04; C07c 103/52
[58] Field of Search....................... 260/112.7, 112.5

[56] References Cited
OTHER PUBLICATIONS
Du et al: Scientia Sinica, 10, 84–96 (1961).

*Primary Examiner*—Lewis Gotts
*Assistant Examiner*—Reginald J. Suyat
*Attorney, Agent, or Firm*—Curtis, Morris & Safford

[57] ABSTRACT

A method for making insulin and certain derivatives thereof from a compound of the formula (I)

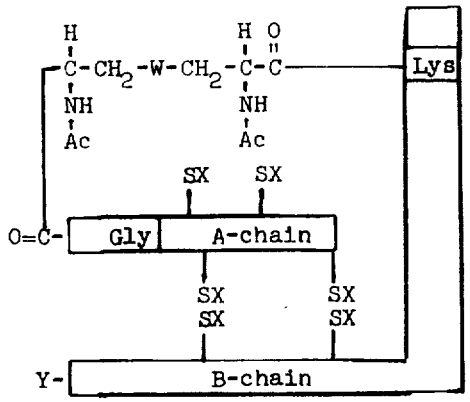

wherein Ac is an N-protective group removable by proton solvolysis, X is hydrogen or an S-protective group, and W is $-(CH_2)-_n$ where $n$ is an integer from zero to four and one $-CH_2-$ member thereof may be replaced by $-S-$ or $-SO_2-$, which comprises solvolyzing the Ac groups and dehydrogenating the $-SX$ groups to S-S bonds to form a compound of the formula (II)

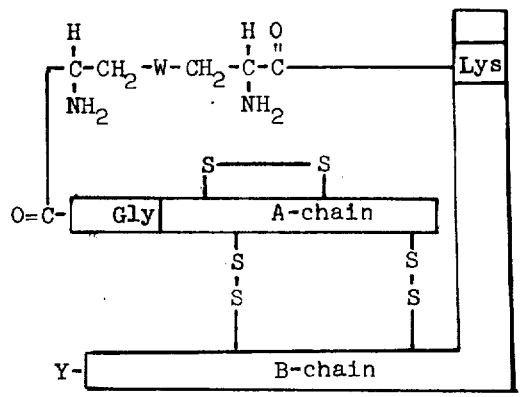

and then eliminating the

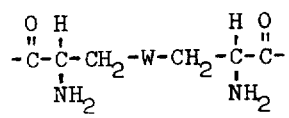

bridge by Edman degradation. Compounds of the formula II.

2 Claims, No Drawings

PROCESS FOR THE MANUFACTURE OF INSULIN, ANALOGS AND DERIVATIVES THEREOF

The present invention relates to a process for the manufacture of insulin as well as the analogs and derivatives thereof, which comprises converting a compound of the general formula I

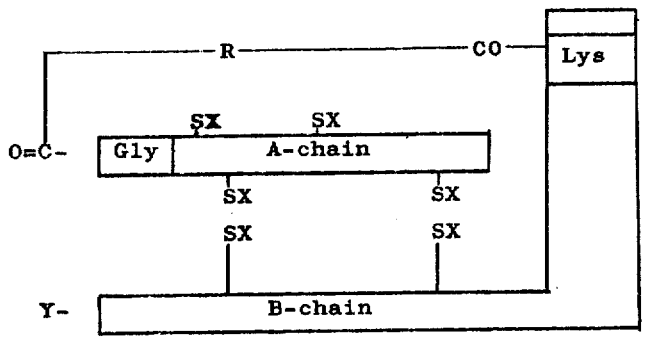

in which X stands for hydrogen or a S-protective group and Y stands for hydrogen, an alkanoyl radical of 1 to 4 carbon atoms, a phenyl-alkanoyl group of 1 to 3 carbon atoms in the alkanoyl moiety, benzoyl or an alkyloxy-carbonyl or arylalkyloxycarbonyl radical, the alkyl moiety containing 1 to 4 carbon atoms, an aminoacyl radical derived from naturally occurring $\alpha$- or $\beta$-amino acids or from the D-enantiomers thereof, or an acylaminoacyl radical, and R stands for a radical of the general formula II

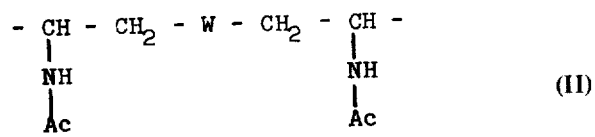

in which Ac stands for an N-protective group capable of being split off by proton solvolysis, and W stands for $(CH_2)_0$ to $(CH_2)_4$, one $CH_2$-member thereof may also be replaced by S or $SO_2$, by splitting-off of the radicals Ac and X and by dehydrogenation, into a compound of the general formula III

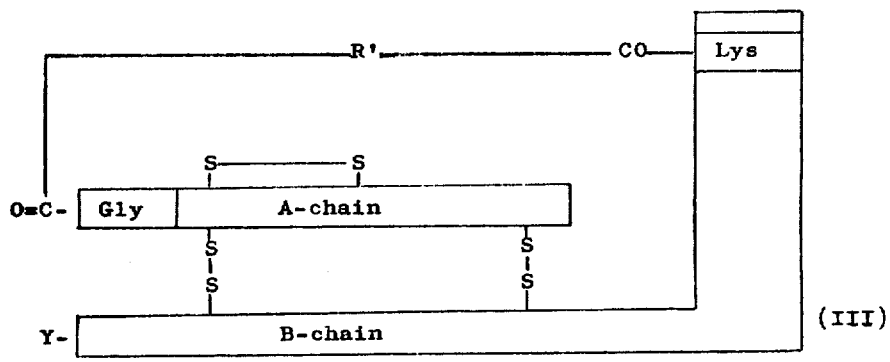

in which Y is defined as above and R' stands for

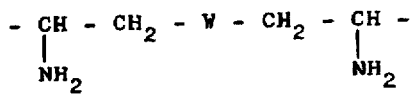

in which W is defined as above, and eliminating the —CO—R'—CO— bridge from this compound by means of the Edman degradation.

This invention moreover relates to compounds of the general formula III, in which R, R', X and Y are defined as above.

Intramolecular cross-linking of insulin by means of the two amino groups $N^{\alpha\ A1}$ and $N^{\epsilon\ B29}$ is already known from Z. Makromol. Chem. 26, 153–166 (1958). Elucidation of the tertiary structure of insulin confirmed the short distance between the two amino groups capable of being bridged by means of bifunctional reagents. It has also been possible since then to link the two amino groups by means of a succincyl or adipinoyl bridge. Thus, novel insulin derivatives have been obtained which, however, could not be reconverted into insulin.

In contradistinction thereto, the process of this invention offers the possibility of regenerating insulin from a molecule showing such an intramolecular cross-linking, since the —CO—R'—CO— bridge can easily be eliminated by means of the Edman degradation from both ends.

The process and the insulin derivatives of the invention corresponding to the general formula III are interesting inasfar as the products can be prepared with a high yield from separately synthesized A- and B-chains. In the combination of the two chains in a high dilution they take over the function held by the C-peptide during the biosynthesis of insulin, i.e. the function of bringing about a combination according to the formula.

The method of the chain combination which today is almost exclusively used according to Scientia Sinica 10 (1961) affords a yield of about 10 percent under favorable conditions. About 40 percent can be obtained in crystallized form. Some authors indicate higher yield which, however, have never been reproducible. The yield in combined chains could hitherto only be increased using the A-chain in an about 5-fold molar excess. Those reaction conditions are, however, no longer economic [Advances Enzymology 33, 455 (1970)] nor is the yield in crystallizable material satisfactory.

In contradistinction thereto, the process of the invention affords yields exceeding 25 percent with a chain ratio of 1:1. Moreover, products that have been combined in a wrong way can be subjected, after reduction, to another combination process since, in this case, the A- and B-chains are at first not altered when linked to each other by means of a bridge according to the invention.

Thus, the process of the invention is also suitable for an industrial-scale synthesis of insulin.

In addition to insulin itself, the process of the invention also allows insulin analogs and derivatives to be prepared.

By insulin analogs there are understood commpounds in which one or more amino acids have been exchanged against other, preferably simpler, amino acids, furthermore insulins having a modified, preferably shortened, chain length.

For example, as already known in the art, in the A-chain $Gln^5$ and $Gln^{15}$ may be replaced by Glu, $Ser^{12}$, $Tyr^{14}$, $Asn^{18}$ and $Asn^{21}$ by Ala, $Val^{10}$ by Leu or another hydrophobic amino acid, furthermore $Tyr^{19}$ by Phe.

In the B-chain, $Phe^1$, $Val^2$, $Asn^3$, $Gln^4$, $His^5$, $Ser^9$, $His^{10}$, $Thr^{27}$ and $Pro^{28}$ may be replaced by simpler amino acids, preferably alanine. The amino acid 1 to 3 and 30 may also be eliminated. Even $Cys^{A7}$ and $Cys^{B7}$ may be replaced by Ala.

Insulin derivatives are understood to be compounds carrying substituted functional groups. For example, the α-amino group of the B-chain may be substituted by an acyl group in a manner analogous to German Offenlegungsschrift Pat. No. 2,042,299. The same applies to the above-defined insulin analogs, always provided that the replacement or substitution does not, or only to a minor extent, decrease the biological activity of the insulins.

As diamino-dicarboxylic acids of the formula $$HOOC-R'-COOH,$$

wherein R' is

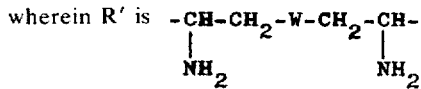

in which W is defined as above, to be used for the bifunctional bridge, there are preferably mentioned 2,3-diamino-succinic acid, 2,4-diamino-glutaric acid, 2,5-diamino-adipic acid, 2,6-diamino-pimelic acid, 2,7-diamino-suberic acid, 2,8-diamino-azelaic acid, 2,9-diamino-sebacic acid, lanthionine, crystathionine, lanthionine-sulfone (3,3'-sulfo-dialanine), crystathionine-sulfone (2,7-diamino-4-sulfo-suberic acid), 2,7-diamino-4-thia-suberic acid or 2,8-diamino-5-thiaazelaic acid or the 4- or 5-sulfo analogs thereof.

The sulfones are advantageously prepared from the N-acylated compounds in known manner by means of $H_2O_2$ or, for example, benzoic peracid. Since these compounds have two asymmetry centers, several stereo-isomers are obtained which are, however, not critical for the process of the invention.

For a temporary masking of the NH-groups, acyl radicals Ac are used. Ac may stand for an amino protective group usual in peptide chemistry; radicals which are capable of being split off by proton solvolysis are preferably used, in particular the tert.-butyloxycarbonyl radical (Boc).

If the B-chain ends in an N-terminal phenylalanine (Y = H), the des-$Phe^{B1}$ insulin is obtained upon elimination of the —CO—R'—CO— bridge by means of Edman degradation [cf. Acta Chem. Scand., 283–293 (1950)] with simultaneous splitting-off of the N-terminal Phe. If Phe is to be preserved, a B-chain is prepared, in which Y stands for an aminoacyl group, for example Gly or Ala, which is eliminated by Edman degradation. Y may also stand for an easily eliminable acyl group, for example the trifluoro-acetyl group (TFA), which is split off, for example by means of dilute NaOH, 0.1M piperidine or 1N $NH_3$, once the insulin synthesis is complete; furthermore, for another acyl radical according to German Offenlegungsschrift No. 2,042,299, which is preserved upon synthesis and yields a corresponding insulin derivative.

As S-protective groups X, there are used radicals which are already known, for example the trityl, diphenylmethyl, acetamidomethyl or tetrahydropyranyl radical, moreover alkylmercapto groups, such as ethylmercapto, isopropylmercapto or tert.-butylmercapto groups, and aminoethyl-carbamoyl protective groups according to German Offenlegungsschrift Pat. No. 1,930,330; furthermore, the ethyl-carbamoyl radical. Even the sulfo group may temporarily serve for the protection of SH-groups; it is, for example, eliminated by the action of excess mercapto compounds. The sulfo group is preferably used as the protective group X in the starting substances of the formula I, whereas the other above-cited groups for X are preferably mentioned for the precursors of the synthesis of the starting substances of formula I.

The starting substances of the formula I are prepared, for example, by reacting insulin A-chain sulfonate prepared according to known methods with excess activated esters, for example 4-nitrophenyl ester of the following formula

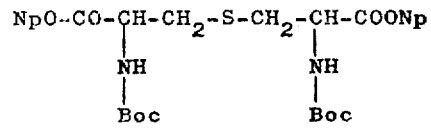

Suitable solvents are dimethyl formamide or dimethylsulfoxide. The reaction product is precipitated using an organic solvent, such as an ether or ethyl acetate and, as an intermediate, for example

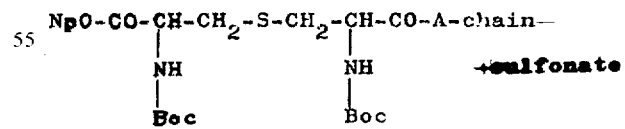

is obtained. This product is again dissolved, preferably in dimethylformamide, phosphoric acid trisdimethylamide or dimethylsulfoxide, and the solution is reacted with an about equimolar amount of B-chain sulfonate in the presence of an amount of N-ethylmorpholine or triethylamine which is sufficient for the neutralization of the acid groups, at a pH-value of from about 8 to 10, and of about 1 equivalent of 1-hydroxybenzotriazole. The ε-amino group in $Lys^{B29}$ of the B-chain used is free, the α-amino group of Phe[B1] may be protected, for example by means of a Boc-Gly, Boc-Ala or TFA radical. The preparation of such a chain is disclosed in Example 1b.

After a reaction time of about 30 minutes to 6 hours at room temperature, the reaction product obtained is a sparingly soluble compound of the formula I, in which X stands for $SO_3^-$, R for

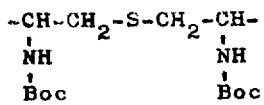

and Y for Boc-Gly or Boc-Ala.

The above-described linkage between A- and B-chains may also be brought about in an inverse order of succession. Without an addition of 1-hydroxy-benzotriazole, reaction times of up to 1 to 2 days are required.

According to the process of the invention, the Boc-groups are then split off by treating them with trifluoroacetic acid for 30 to 60 minutes, the reaction product is precipitated with ether and the dried substance is taken up, where required upon purification by chromatography, in a 8-M aqueous urea solution or water of pH 5–9. Under nitrogen, a 10- to 500-fold excess of thioglycol or a 1- to 5-fold calculated amount of trialkylphosphine, for example tributyl-phosphine, is added, the mixture is precipitated after a reaction time of about 4 to 6 hours at room temperature with acetone in acetic acid, centrifuged and washed several times with acetone in acetic acid. The product is dissolved in the smallest possible amount of aqueous $NH_3$ and diluted with 0.05M of $(NH_4)HCO_3$, the pH of which being adjusted to 10–10.6, to reach a peptide concentration of 0.01 to 1 mg/ml, and the mixture is stirred overnight at 0°–20°C in a weak air stream. When operating at a lower pH-value, for example of 8 to 10, the reaction times required are longer, for example up to about 150 hours. The pH-value is then adjusted to 4–5.5 by means of 1N acetic acid and the solution is lyophilized or evaporated to dryness in vacuo.

For purification purposes, the product is chromatographed in 1N to 2N acetic acid by means of Sephadex G 50 or G 75 in a column having a length of 1 to 2 meters. The "insulin" peak (up to 50 percent) is processed in the following manner, the product that has been combined in the wrong way (up to about 30 percent) is recycled, after reduction, to a recombination.

The cross-linked crude insulin of the general formula III is taken up in about 20 times the amount of 95 percent pyridine. After filtration, the solution is reacted with 8 to 16 moles of phenyl-isothiocyanate during about 1 hour at about 10° to 30°C, part of the solvent is distilled off in vacuo, the mixture is precipitated with ether, the operation is repeated and the precipitate is then allowed to stand for about 2 hours with 5 to 10 times its amount of trifluoroacetic acid at about 25°C. The crude insulin is precipitated with ether, chromatographed in 1N to 2N acetic acid via a column charged with Sephadex G-50 or G-75 and having a length of 1 to 2 meters, and then directly precipitated in usual manner from the solution with an addition of Zn ions at about pH 5.4 to 5.5, and crystallized where required. The yield of crystallized material is 15 to about 30 percent of the theoretical yield (excluding material which, if combined in the wrong way, has to be reduced once more.)

Upon measuring the blood sugar lowering effect on rabbits, it was found that the biological activity of the crystallized insulin obtained according to the process of the invention is 23 I.U. per mg. Analysis of the amino acids is correct. It is used, instead of material recovered from the pancreas, for the treatment of diabetes mellitus.

Instead of the synthesis methods described in the following examples for A and B-chains with the aid of the Solid phase method, the known methods of fragment condensation, for example the carbodiimide method, where required with an addition of N-hydroxy-succinimide, 1-hydroxy-benzotriazoles, 3-hydroxy-3-oxo-3,4-dihydro-1,2,3-benzotriazine, or the azide method, may be applied for the manufacture of the A- and B-chains used as starting materials.

The following Examples illustrate the invention.

EXAMPLE 1

Bovine insulin a. A-chain S-tetrasulfonate (cattle)

The bovine insulin A-chain was prepared according to Hoppe Seyler's Z. Physiol. Chem. 352 419–429 (1971) following the solid phase method and starting from polystyrene resin with a cross-linking rate of 1 %. The first amino acid, namely asparagine, was esterified as Boc-Asn(Mbh)-OH (prepared from H-Asn(Mbh)-OH [cf. Chem. Ber. 103, 2041 – 2051 (1970), using Boc azide] with the hydroxy groups of the resin in known manner.

All the following amino acids were used as Boc amino acid 4-nitro-phenyl esters. Carboxyl groups in the side chains were present as benzyl esters, hydroxy groups of serine and tyrosine as benzyl ethers. The SH-group of cystein was protected by the S-tert.-butylmercapto group (cf. Peptides 1969, North Holland Publishing Comp., Amsterdam 1971, page 30).

Each condensation step was performed in the presence of 1-hydroxy-benzotriazole in a manner described in "Chemistry and Biology of Peptides" 343 (1972), in order to increase reaction speed and specificity.

When the synthesis was complete, the A-chain was split off from the resin in known manner by means of hydrogen fluoride and converted by sulfitolysis of the asymmetric disulfides according to Hoppe Seyler's Z-Physiol. Chem. 352 419–429 (1971), into the S-tetrasulfonate and then purified. The A-chain sulfonate prepared in this manner and purified (yield of synthesis 65 percent, yield of sulfitolysis 28 percent) could not be distinguished by electrophoresis from a compound prepared from natural insulin.

b. $N^\alpha$-Boc-Ala-B-chain S-disulfonate

The bovine insulin B-chain was prepared according to Hoppe Seyler's Z. Physiol. Chemie 348, 1355 (1967) and 352,419 (1971), according to Merrifield [Biochemistry 3, 1385 (1964)], starting from polystyrene resin with a cross-linking rate 1 percent. Lysine was used as Boc-Lys(Pht)-ONp, all the other amino acids likewise as Boc-nitrophenyl esters, further carboxy groups in the side chains were present as benzyl esters according to the Merifield method, hydroxy groups of serine and tyrosine as benzyl ethers. The SH-group of cystein was protected by means of the S-tert.-butylmercapto group (cf. Peptides 1969, North Holland Publishing Comp., Amsterdam 1971, page 30).

Each condensation step was performed in the presence of 1-hydroxy-benzotriozole, in order to increase reaction speed and specificity.

When the synthesis was complete, the B-chain was split off from the resin in known manner by means of hydrogen fluoride. Yield: 55 %, calculated on the first amino acid Ala$^{B30}$. 3.6 Grams (1 mmol) of the $N^\epsilon$ $^{B29}$-Pht-B-chain still S-protected were then reacted in 100 ml of dimethylformamide with 390 mg (1.2 mmols) of Boc-Ala-ONp during 1 hour at room temperature in the presence of 135 mg of 1-hydroxy-benzotriazole. After the solvent had been distilled off in vacuo until a volume of 10 ml was reached and, after ethyl acetate had been added, 3.5 g of Boc-AlA-S-tert.-butylmercapto-$N^\epsilon$ Pht-B-chain were obtained. For splitting of the phthaloyl group, the compound was dissolved in 100 ml of 80 percent phenol and, after addition of 4 ml of hydrazine hydrate, the solution was heated to 40°C for 16 hours. Subsequently, 3.3 g of the compound that had been freed from the phthaloyl group were precipitated by means of 1 l of isopropanol —ether (1 +5). The compound was converted into the disulfonate according to Example 1 (a); yield: 3.0 g.

In a corresponding manner, the $N^\alpha$ -Boc-61y-B-chain S-disulfonate was prepared.

c. Preparation of bridging reagents

1. Di-Boc-L-lanthionine

7 Milliliters of Boc-azide were added to a solution of 3.5 grams of L-lanthionine in 30 ml of water and 20 ml of dioxan. The pH-value was adjusted to 10 and maintained for 4 hours at 55°C by means of a pH-stat. The mixture was then extracted with ethyl acetate, cooled to about 4°C, acidified with concentrated citric acid and extracted with ethyl acetate. The ethyl acetate solution was washed, dried over Na$_2$SO$_4$ and evaporated in vacuo. The residue was dissolved in hot ethyl acetate, petrol ether was added until the mixture began to become turbid, and then the mixture was cooled slowly, whereupon 2.3 g of Boc$_2$-L-lanthionine precipitated. Melting point 142 to 144°C (decomposition).

2. Di-Boc-L-lanthionine bis-4-nitrophenyl ester

1 Gram of di-Boc compound of Example 1c was dissolved with 0.8 g of 4-nitrophenol in 15 ml of tetrahydrofuran. 1.1 Grams of DCC$^{-)}$ were added, the mixture was stirred for 4 hours at room temperature, urea that had precipitated was suction-filtered and the solvent was concentrated in vacuo. The residue was recrystallized from isopropanol. Yield: 1.2 g, m.p. 161°–163°C (decomp.)

$^{-)}$ (=dicyclohexyl carbodiimide)

3. Di-Boc-L-lanthionine bis-N-hydroxy-succinimide ester

In a manner analogous to (2), 1.01 g of the di-activated ester were obtained from 1 g of di-Boc-amino acid, 0.61 g of N-hydroxy-succinimide and 1.1 g of DCC in tetrahydrofuran upon boiling with isopropanol. M.p. 178°–179°C (decomposition).

4. Di-Boc-2,6-diamino-meso-pimelic acid bis-2,4,5-trichlorophenyl ester 1.0 Grams of di-activated ester was obtained from 0.95 g of di-Boc-α, ε-diamino-meso-pimelic acid, prepared according to Bull. Soc. chim. France 1965, page 1813, in a manner analogous to (2) with 0.8 g of 2,4,5-trichloro-phenol and 1.1 g of DCC in tetrahydrofuran. M.p. 156°–159°C (decomposition).

5. Di-Boc-2,7-diamino-suberic acid-bis-2,4,5-trichlorophenyl ester

The diastereomer mixture of 2,7-diamino-suberic acid was prepared according to Hoppe Seyler's Z. Physiol. Chem. (1905), page 92. N,N'-di-Boc-2,7-diamino-suberic acid was synthesized according to the usual method with Boc-azide (m.p. 175°–177°C). The corresponding bis-2,4,5-trichlorophenyl ester was prepared according to the general method described in Helv. Chim. Acta (1963), page 1609, from bis-Boc-diamino-suberic acid, DCCI and 2,4,5-trichlorophenyl in DMF (m.p. 198°–201°C).

6. Di-Boc-2,8-diamino-azelaic acid-bis-2,4,5-trichlorophenyl ester

Preparation analogous to (5). M.p. 192°–195°C.

7. Di-Boc-2,9-diamino-sebacic acid-bis-2,4,5-trichlorophenyl ester

Preparation analogous to (5). M.p. 173°–175°C.

d. Bovine insulin

The pH-value of a solution of 2.8 g of the A-chain tetrasulfonate prepared according to (a) in 100 ml to 300 ml of dimethyl sulfoxide was adjusted to about 9 by means of N-ethylmorpholine and the solution was stirred with 2.0 g of the trichlorophenyl ester prepared according to (c)(5). After 20 hours, the mixture was precipitated with ether-methanol (10:1). 2.7 Grams of mono A-chain tetrasulfonate of di-Boc-α,α-diaminosuberic acid-monotrichlorophenyl ester (89 %) were obtained. The product was taken up in 100'-300 ml of dimethylsulfoxide, 3.0 g of $N^\alpha$ -Boc-Ala-(or $N^\alpha$ -Boc-Gly-) B-chain disulfonate prepared according to 1b, 120 mg of 1-hydroxy-benzotriazole and some triethylamine (up to pH 9) were added, and stirring was continued for 6 hours at room temperature. The mixture was then precipitated with ether-methanol (10:1). Yield: 5.5 g. The crude reaction product was taken up in 40 ml of trifluoroacetic acid. After 40 minutes, 5.0 g of the compound of the general formula I, wherein R is R' and W = —(CH$_2$)$_4$—, X = SO$_3^-$ and Y = Ala or Gly, were precipitated with 400 ml of ether. After column chromatography using Sephadex G 50 (column length: 4 m, diameter: 4 cm) in 0.05M of (NH$_4$)HCO$_3$-buffer of pH 8.5–9, and lyophilization, the product (3.3 g) was taken up in 0.25 l of water of pH 8.6. 50 Milliliters of thioglycol were added, the mixture was stored for 6 hours under nitrogen, precipitated with 10 to 20 times its amount of acetone in acetic acid, centrifuged and freed from thioglycol by washing it with acetone in acetic acid. The mixture was then dissolved in a small amount of 1N NH$_3$, diluted to a volume of 25 l and its pH-value was adjusted to 9 by means of 1N NH$_3$, the mixture was stirred for about 100 hours at room temperature in a weak air stream, the pH-value was adjusted to about 4 to 5 by means of acetic acid, and the solution was lyophilized.

The residue was dissolved in 50 ml of 10 percent acetic acid or formic acid and chromatographed by means of a column having the size of 4 × 200 cm and containing Sephadex G-50, fine. Distribution chromatography of Sephadex LH-20 in a system of n-butanol/acetic acid/water (2:1:10) also allowed a good purification (column: 4 × 100 to 4 × 200 cm). The columns were calibrated with cross-linked insulin. After a preliminary peak (0.3 g) the peak of the cross-inked insulin (2.5 g) appeared. The preliminary peak was reduced with 1,4-dithiothreitol in liquid ammonia or with tributyl-phosphine in dilute aqueous ammonia at pH 8–10 according to J.Amer.Chem.Soc. 93 (1971), page 3080, and oxidized as above in water at pH 9.

The 2.5 g of cross-linked crude insulin obtained upon chromatography were stirred in 60 ml of 95 percent pyridine twice for 1 hour at 40°C with 0.7 ml of phenyl isothiocyanate. The pyridine was concentrated to a volume of 10 ml. By adding ether, 2.4 g of phenyl-thiocarbamoyl compound precipitated. After drying, this compound was stored for 2 hours in 20 ml of trifluoroacetic acid at 25°C. 2.2 Grams of crude insulin were precipitated with 200 ml of ether. After another purification operation by chromatography by means of Sephadex G-75 as disclosed above, an insulin fraction was obtained which precipitated in an amorphous form in the usual manner after addition of $ZnCl_2$ an adjustment of the pH to 5.4 but crystallized within 1 to 2 days. The crystals were cautiously separated from uncrystallized material by centrifuging, crystallization was repeated and 1.15 g (19 %, calculated on A-chain material used) were obtained, comprising 23 to 24 I.U. per mg.

EXAMPLE 2

Des-(Phe-Val)$^{B1-2}$-des-Ala$^{B30}$-[Ala$^{A12,14,18,21}$]insulin (pig)

a. Ala$^{12,14,18,21}$-insulin A-chain S-tetrasulfonate (pig)

In a manner analogous to Example 1 (a), a pig's insulin A-chain was prepared according to the solid phase method, Boc-Ala-OH being esterified as the first amino acid (A 21) with the hydroxy groups of the resin. In the positions 18, 14 and 12, Boc-Ala-ONp groups were introduced instead of amino acids that hold these positions in the natural chain. The further course of synthesis and the work-up were the same as disclosed in Example 1 a. Yield of synthesized material: 69 percent, that obtained by sulfitolysis: 34 %.

b. n -Boc-des-Phe$^{B1}$-des-Ala$^{B30}$-insulin B-chain S-disulfonate (pig)

The bovine insulin B-chain was prepared in a manner analogous to Hoppe Seyler's Z, Physiol. Chemie 348, 1355 (1967) and 352, 419 (1971), according to Merrifield [Biochemistry 3, 1385 (1964)], starting from polystyrene resin with a cross-linking rate of 1 percent. Lysine was used as Boc-Lys(Pht)-ONp, all the other amino acids also as Boc-nitrophenyl esters, further carboxy groups in the side chains were present as benzyl esters according to Merrifield, hydroxy groups of serine and tyrosine as benzyl ethers. The SH-group of cystein was protected by means of the S-tert.-butylmercapto group (cf. Peptides 1969, North Holland Publishing Comp., Amsterdam, 1971, page 30). The synthesis ended with Boc-Val-ONp$^{(B2)}$.

Each condensation step was performed in the presence of 1-hydroxy-benzotriazole, When the reaction was complete, the B-chain was split off in known manner from the resin with hydrogen fluoride. Yield: 55 %, calculated on the first amino acid Ala$^{B30}$. 3.6 Grams (1 mmol) of the N$^\epsilon$ -Pht-B-chain still S-protected were then reacted in 100 ml of dimethyl sulfoxide with 300 mg (1.2 mmols) of Boc-ONp in the presence of 135 mg of 1-hydroxybenzotriazole for 1 hour at room temperature. After the solvent has been distilled off in vacuo until a volume of 10 ml remained and ethyl acetate had been added, 3., g of the corresponding Boc-S-tert.-butylmercapto-N$^\epsilon$ -Pht-B-chain were obtained.

For splitting off the phthaloyl group, the compound was dissolved in 100 ml of 80 % phenol and, after addition of 4 ml of hydrazine hydrate, the mixture was heated to 40°C for 16 hours. 3.3 Grams of the compound that has been freed from the phthaloyl group were then precipitated with 1 l of isopropanol-ether (1 + 5) and converted into the disulfonate as in Example 1 a. Yield: 3.1 g.

c. Des-(Phe-Val)$^{B1-2}$-des-Alq$^{B30}$-[Ala$^{A12,14,18,21}$] insuline (pig)

The pH-value of a solution of 2.8 g of A-chain tetrasulfonate as prepared according to (a) in 100 ml of 90 percent dimethyl sulfoxide was adusted to 7.5 by an addition of N-ethyl-morpholine and the solution was stirred with 2 g of the nitrophenyl ester as prepared according to Example 1 (c,2). After 20 hours, the mixture was precipitated with ethyl acetate or ether-methanol (10:1). 2.4 Grams of mono-A-chain tetrasulfonate of di-Boc-lanthionine-mononitrophenyl ester (80 %) were obtained. The compound was taken up in 100 ml of dimethylsulfoxide, 2.9 g of the B-chain disulfonate prepared in Example 2 b, 120 mg of 1-hydroxy-benzotriazole and some triethylamine (up to pH 9) was added, and stirring was continued for 1 hour at room temperature. The mixture was precipitated again with ethyl acetate or ether-methanol (10:1). Yield: 5.0 g. The crude reaction product was taken up in 40 ml of trifluoroacetic acid. After 40 minutes, the solution was precipitated with 400 ml of ether. 4.9 Grams of the compound of the general formula, wherein

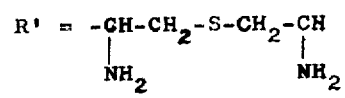

$X = SO_3^-$, $Y = H$ and a B-chain that was shortened by $B^1$ and $B^{30}$, were obtained.

The product was taken up in 0.25 l of water of pH 8.6. 50 Milliliters of thioglycol were added, the mixture was stored for 6 hours under nitrogen, precipitated with 15 times its amount of acetone in acetic acid, centrifuged and washed with the same solvent. The mixture was then dissovled in a small amount of 1N $NH_3$, diluted to a volume of 25 liters and the pH-value adjusted to 10 by means of 1N $NH_3$. The mixture was stirred for 30 hours at 10°C in a weak air stream, acetic acid was added until a pH of 5.5 was reached, and the solution was lyophilized.

The residue was dissolved in 50 ml of 10 percent acetic acid and chromatographed by means of a column having a size of 4 × 100 cm and containing Sephadex G-75, fine. The column was calibrated by means of cross-linked insulin. After a preliminary peak (0.4 g) the peak of cross-linked insulin appeared (3.0 g). The preliminary peak was reduced as in Example 1 and oxidized in 1.5 l of water as above at pH 10.

The 3.0 g of cross-linked crude insulin derivative obtained upon chromatography were subjected to the Edman degradation as in Example 1. 2.0 Grams of crude "insulin" were obtained. After a purification operation by chromatography using Sephadex G-75 an insulin fraction of 1.4 g (17 %), calculated on A-chain material used, was obtained comprising about 20 I.U. per mg.

EXAMPLE 3

Des-phenylalanine$^{B1}$-insulin (cattle)

a A-chain S-tetrasulfonate (cattle)

The compound was prepared in a manner analogous to Z. Naturforschung 24 b 1127–1139 (1969), showing the improvements described in Hoppe Seyler's Z. Physiol. Chem. 352, 2 (1971). The protective groups were split off, also the S-trityl groups, by dissolving the peptide in trifluoroacetic acid and pouring the solution into water after 1 hour. After filtration and extraction with ether, the product was lyophilized and converted into S-tetrasulfonate in a manner analogous to Z. Naturforschung 24b 1138 (1969).

b. N+-Boc-B-chain S-disulfonate (cattle)

Synthesis of the B-chain was carried out as in Example 1b,

When the synthesis was complete, the B-chain was split off in known manner from the resin by means of hydrogen fluoride. Yield: 55 percent calculated on the first amino acid Ala$^{B30}$. 3.6 Grams (1 mmol) of N$^\epsilon$-Pht-B-chain still S-protected were then reacted in 100 ml of dimethylformamide with 300 mg (1.2 mmols) of Boc-ONp in the presence of 135 mg of 1-hydroxybenzotriazole during 1 hour at room temperature. After the solvent had been distilled off in vacuo until a volume of 10 ml remained and ethyl acetate had been added, 3.5 g of N$^\alpha$-Boc-S-tert.-butylmercapto-N$^\epsilon$-Pht-B-chain were obtained.

For splitting off the phthaloyl group, the compound was dissolved in 100 ml of 80 percent phenol, and after addition of 4 ml of hydrazine hydrate, the mixture was heated to 40°C for 16 hours. 3.3 Grams of the compound that had been freed from the phthaloyl group were then precipitated with 1 l of isopropanol-ether (1 + 5) and converted into the disulfonate as in Example 1a.

Yield: 3.0 g.

c. Des-Phe$^{B1}$—insulin (cattle)

The pH-value of a solution of 2.8 g of A-chain tetrasulfonate prepared according to (a) in 200 ml of dimethylsulfoxide was adjusted to 7.5 by the addition of 2 N-ethylmorpholine and the solution was stirred with 2 g of the nitrophenyl ester prepared according to Example 1 (c, 4). After 20 hours, the mixture was precipitated with ethyl acetate. 2.65 Grams of mono-A-chain tetrasulfonate of di-Boc-αε-diaminomeso-pimelic acid mononitrophenyl ester were obtained. The product was again taken up in 100 ml of dimethyl formamide, 3.0 g of N$^\alpha$-Boc-B-chain disulfonate prepared as in Example 1b, 120 mg of 1-hydroxy-benzotriazole and some triethylamine (up to pH 9) were added, and stirring was continued for 1 hour at room temperature. The mixture was then precipitated with ethyl acetate. Yield: 5.5 Grams. The crude reaction product was taken up in 40 ml of trifluoroacetic acid. After 40 minutes, 5.0 g of the compound of the general formula I, wherein

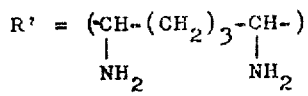

$X = SO_3^-$ and $Y = H$, were precipitated with 400 ml of ether.

The product was purified, reduced and dehydrogenated to yield cross-linked insulin in the manner described in Example 1.

The residue was dissolved in 50 ml of 10 percent acetic acid and chromatographed by means of a column having a size of 4 × 100 cm and containing Sephadex G-75, fine. The column was calibrated with cross-linked insulin. After a preliminary peak (0.3 g), the insulin peak appeared (3.5 g). The preliminary peak was reduced as in Example 1 and oxidized in 1.5 l of water as above. The 3.5 g of cross-linked crude insulin obtained upon chromatography were subjected to the Edman degradation as in Example 1. 2.6 Grams of crude des-Phe$^{B1}$ bovine insulin were obtained.

After purification by chromatography by means of Sephadex G-75, an insulin fraction was obtained which precipitated in an amorphous form in the usual manner after an addition of ZnCl$_2$ and adjustment of the pH to 5.4 but crystallized in the course of 1 to 2 days. The crystals were cautiously separated from uncrystallized material by centrifuging, crystallization was repeated and 1.48 g of des-Phe$^{B1}$-insulin (cattle), calculated on A-chain material used, were obtained, comprising 23 to 24 I.U. per mg.

EXAMPLE 4

B1-acetyl insulin (pig)

a. A-chain S-tetrasulfonate (pig)

The preparation was analogous to Example 1a, the amino acid sequence of the pig's insulin A-chain being taken into regard. Yield upon synthesis: 68 percent, upon sulfitolysis: 32 percent.

b. B1-acetyl B-chain S-disulfonate

The chain was synthesized in a manner analogous to Example 1 (b) using, however,

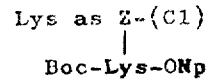

and Phe$^{B1}$ as N-acetyl-Phe-ONp.

When the synthesis was complete, the B-chain was split off in known manner from the resin by means of hydrogen fluoride. Yield: 59 percent, calculated on the first amino acid Ala$^{B30}$. The substance was converted into the disulfonate as in Example 1a.

c. B1-acetyl insulin (pig)

The pH-value of a solution of 2.8 g of the A-chain tetrasulfonate prepared according to (a) in 300 ml of dimethylsulfoxide was adjusted to 9 by addition of N-ethyl-morpholine, and the mixture was stirred with 1.65 g of the di-Boc-2,7-di-amino-suberic acid-bis-(2,4,5-trichlorophenyl ester) prepared according to Example 1 (c, 5). After 20 hours, the mixture was precipitated with ether/methanol (10:1). 2.65 Grams of mono-A-chain tetrasulfonate of di-Boc-2,7-diamino-suberic acid-mono(2,4,5-trichlorophenyl ester) were obtained. This substance was again taken up in 300 ml of dimethylsulfoxide, 3.0 g of the N-acetyl B-chain disulfonate, prepared according to (b), 120 mg of 1-hydroxy-benzotriazole and some triethylamine (up to pH 9) were added, and stirring was continued for 6 hours at room temperature. The mixture was then precipitated with ether/methanol. Yield:5.38 g. The crude reaction product was taken up in 40 ml of trifluoroacetic acid. After 40 minutes, 5.06 g of the compound of the general formula I, wherein R' is

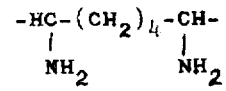

$X = SO_3$ and $Y = $ acetyl, were precipitated with 400 ml of ether.

The product was purified, reduced and dehydrogenated to yield cross-linked insulin derivative as in Example 1.

The residue was dissolved in 50 ml of 10 percent acetic acid and chromatographed by means of a column having a size of 4 × 100 cm and containing Sephadex G-75, fine, or purified by distribution chromatography on Sephadex LH 20. The column was calibrated with cross-linked acetyl-insulin. After a preliminary peak (0.55 g) the insulin peak appeared (3.75 g). The preliminary peak was reduced as in Example 1 and oxidized as above.

The 3.75 g of cross-linked crude insulin obtained upon chromatography were subjected to the Edman degradation. 2.6 Grams of crude B1-acetyl-insulin (pig) were obtained.

After purification by chromatography using Sephadex G-75 or G-50 superfine, a fraction was obtained which precipitated in an amorphous form in usual manner after addition of ZnCl₂ and adjustment of the pH to 5.4 but crystallized in the course of some days. The crystals were cautiously separated from the uncrystallized material by centrifuging, crystallization was repeated and 1.62 g (27%), calculated on A-chain material used, were obtained comprising 22 to 25 I.V. per mg.

Example 5

Human insulin a. A-chain S-tetrasulfonate (human)

Preparation analogous to Examples 1a and 4a. Yield upon synthesis: 55 percent; upon sulfitolysis: 33 percent.

b. $N^\alpha$ -Boc-Ala-B-chain S-disulfonate (human)

Synthesis analogous to Example 1b. As the first amino acid, however, Boc-Thr-OH was esterified with the hydroxy groups of the resin. Yield; 62 percent.

When the reaction was complete, the B-chain was split off in known manner from the resin by means of hydrogen fluoride. Yields: 58 percent, calculated on the first amino B30Thr$^B$. 3.6 Grams (1 mmol) of the $N^\epsilon$ -Pht-B-chain still S-protected were reacted in 100 ml of dimethylsulfoxide with 390 mg (1.2 mmols) of Boc-Ala-DNp in the presence of 135 mg of 1-hydroxybenzotriazole during 1 hour at room temperature. After the solvent had been distilled off in vacuo until a volume of 10 ml remained and ethyl acetate had been added, 3.5 g of Boc-Ala-S-tert.-butyl-mercapto-$N^\epsilon$ Pht-B-chain were obtained.

For splitting off the phthaloyl group, the compound was dissolved in 100 ml of 80 percent phenol and, after addition of 4 ml of hydrazine hydrate, the mixture was heated to 40°C for 16 hours. 3.3 Grams of the compound that had been freed from the phthaloyl group were then precipitated with 1 l of isopropanol/ether (1 + 5) and converted into the disulfonate as in Example 1 (a).

Yield: 3.0 g.

As in Example 1a, Ala may also be replaced by Gly in the B-chain S-disulfonate.

c Human insulin

The pH-value of a solution of 2.8 g of the A-chain tetrasulfonate prepared according to (a) in 300 ml of dimethylsulfoxide was adjusted to 9 by adding N-ethylmorpholine, and the mixture was stirred with 1.55 g of the di-Boc-2,8-diaminoazelaic acid-bis(2,4,5-trichlorophenyl ester) prepared according to Example 1 (c,5). After 20 hours, the mixture was precipitated with ether/methanol (10:1). 2.63 Grams of mono-A-chain tetrasulfonate of di-Boc-2,8-diamino-azelaic acid-mono(2,4,5-trichlorophenyl ester) were obtained. The product was again taken up in 300 ml of dimethylsulfoxide, 3.0 g of the $N^\alpha$ -Boc-Ala-B-chain disulfonate prepared according to Example 1(b), 120 mg of 1-hydroxy-benzotriazole and some triethylamine (up to pH 9) were added, and stirring was continued for 6 hours at room temperture. The mixture was then precipitated with ether/methanol (10:1). Yield: 5.43 g. The crude reaction product was taken up in 40 ml of trifluroacetic acid. After 40 minutes, 5.0 g of the compound of the general formula 1, wherein R is R' =

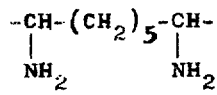

$X = So_3^-$ and $Y = $ Ala, were precipitated with 400 ml of ether.

The product was purified, reduced and dehydrogenated to yield cross-linked insulin derivative as in Example 1.

The residue was dissolved in 50 ml of 10 percent acetic acid and chromatographed by means of a column having a size of 4 = 100 cm and containing Sephadex G-500, superfine, or it was purified by distribution chromatography on Sephadex LH-20 as in Example 1d. The column had been calibrated with corresponding cross-linked insulin. After a preliminary peak (0.57 g) the insulin peak appeared (3.6 g). The preliminary peak was reduced as in Example 1 and oxidized as above.

The 3.6 g of crude insulin derivative obtained upon chromatography were subjected to the Edman degradation as in Example 1. 2.9 Grams of crude human insulin were obtained.

After another purification operation by chromatography using Sephadex G-75 as above, an insulin fraction was obtained which precipitated in an amorphous form in the usual manner after addition of ZnCl₂ and adjustment of the pH-value to 5.4 but crystallized in the course of 1 to 2 days. The crystals were cautiously separated from uncrystallized material by centrifuging, crystallization was repeated and 1.35 g (23%), calculated on A-chain material used, were obtained comprising 24 to 25 I.U. per mg.

Example 6

Des-Phe$^{B1}$-insulin (cattle)

a. Bovin insulin A-chain tetrasulfonate

The preparation from bovine insulin by sulfitolysis was carried out in known manner.

b. $N^{B1}$-trifluoroacetyl B-chain disulfonate (cattle)

Preparation by sulfitolysis of $N^{B1}$-trifluoroacetyl insulin (cattle) in known manner. This starting product was prepared as follows: $N^\alpha$ $^{A1}$, $N^\epsilon$ $^{B29}$-bis-Boc-insulin prepared according to Hoppe Seyler's Z. Physiol. Chem. 352 (1971), page 1487, was dissolved in dimethylformamide, and the solution was reacted with about 5 equivalents of methyl trifluoroacetate, whereupon $N^\alpha$ $^{A1}$, $N^\epsilon$ $^{B29}$-bis-Boc-$N^\alpha$ $^{B1}$insulin (cattle) was obtained. After the Boc-groups had been split off by a treatment with trifluoroacetic acid for 45 minutes, the product was purified by distribution chromatography on Sephadex LH-20 in a system of n-butanol/glacial acetic acid/water (2:1:10).

c. Des-Phe$^{B1}$-insulin (cattle)

2.82 Grams of the A-chain tetrasulfonate prepared according to (a) were stirred in 200 ml of dimethylsulfoxide with an addition of 1.11 ml of N-ethylmorpholine and 1.65 g of di-Boc-2,7-diamino-suberic acid -bis-(2,4,5-trichlorophenyl ester). After 20 hours, the mixture was precipitated by means of ether/methanol (10:1). 3.5 Grams of mono-A-chain tetrasulfonate of di-Boc-2,7-diamino-suberic acid mono(2,4,5-trichlorophenyl ester) were obtained. The product was then taken up again in 200 ml of dimethylsulfoxide, 3.45 g of the $N^{B1}$-trifluoroacetyl B-chain disulfonate prepared according to (b), 130 mg of 1-hydroxybenzotriazole and 1.1 ml of N-morpholine were added, and stirring was continued for 6 to 24 hours at room temperature. The mixture was then precipitated with ether/methanol (10:1). Yield: 5.4 g. The crude reaction product was taken up in 40 ml of trifluoroacetic acid. After 40 minutes, 5.0 g of the compound of the general formula I, wherein R' is

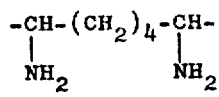

X = SO$_3^-$ and Y = CF$_3$CO—, were precipitated with 400 ml of ether at 0°C.

The compound was purified by chromatography on Sephadex G-50, superfine, in 0.05 M (NH$_4$)HCO$_3$ (pH 8.5) (4.5 g after lyophilization) and reduced in a manner analogous to Example 1 and oxidized at pH 9 within 150 hours. Under these conditions, the trifluoroacetyl group was split off simultaneously. The pH-value was adjusted to 5.5 and the solution was lyophilized.

The residue was dissolved in 50 ml of 10 percent acetic acid and chromatographed by means of a column having a size of 4 × 100 cm and containing Sephadex G-75, fine. The column was calibrated with insulin. After a preliminary peak (1.28 g) the insulin peak appeared (2.81 g). The preliminary peak was reduced as in Example 1 and oxidized in 15 l of water at pH 9.0.

The 2.81 g of crude insulin derivative obtained upon chromatography were stirred in 60 ml of 95 percent pyridine for 3 hours at 40°C with 0.7 ml of phenylisothiocyanate. The pyridine was concentrated to a volume of 10 ml. By adding ether, 2.4 g of phenylthiocarbamoyl compound precipitated. After the operation had been repeated, the dried substance was stored for 2 hours at 25°C in 20 ml of trifluoroacetic acid. 2.2 Grams of crude insulin were precipitated using 200 ml of ether. After another purification operation by chromatography using Sephadex G-75 as above, an insulin fraction was obtained which precipitated in an amorphous form in the usual manner after addition of ZNCl$_2$ and adjustment of the pH-value to 5.4 but crystallized in the course of 1 to 2 days. The crystals were cautiously separated from uncrystallized material by centrifuging, crystallization was repeated and 1.38 g (22 %), calculated on A-chain material used, of des-Phe$^{B1}$-insulin (cattle) were obtained comprising 23 to 25 I.U. per mg.

What is claimed is:

1. A method for making an insulin compound of the formula

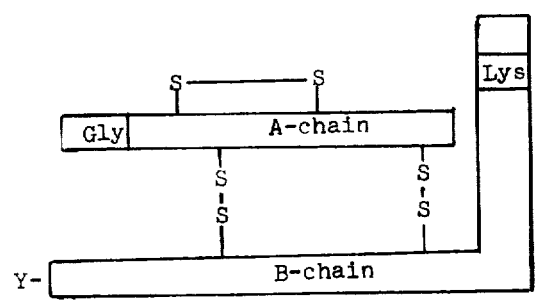

wherein Y is hydrogen, alkanoyl having 1 to 4 carbon atoms, phenyl-alkanoyl having 1 to 3 carbon atoms in the alkanoyl portion, benzoyl, alkyloxy-carbonyl or aralkyloxy-carbonyl having 1 to 4 carbon atoms in the alkyl portion, or aminoacyl derived from a naturally-occurring α- or β-amino acid or from the D-enantiomer thereof, and biologically-active analogs thereof in which one or more amino acids have been exchanged for other, preferably simpler, amino acids or in which the chains are modified, preferably shortened, in length, which process comprises cleaving N-protective and S-protective groups from a compound of the formula

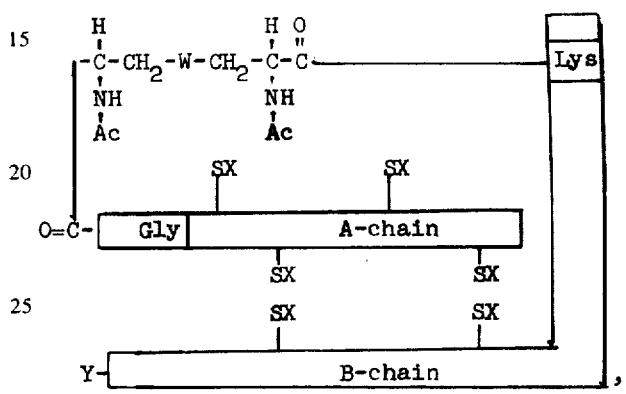

or analogs thereof in which one or more amino acids have been exchanged for other, preferably simpler, amino acids or in which the chains are modified, preferably shortened, in length wherein Ac is an N-protective group cleaved by proton solvolysis, X is hydrogen or an S-protective group, and W is (CH$_2$)$_n$—, where n is an integer from zero to four, or is —S—, —S—CH$_2$—, —CH$_2$—S—CH$_2$—, —SO$_2$—, —SO$_2$—CH$_2$—, or —CH$_2$—SO$_2$—CH$_2$—, dehydrogenating —SH groups in the resultant product to form S—S bonds, whereby a compound of the formula

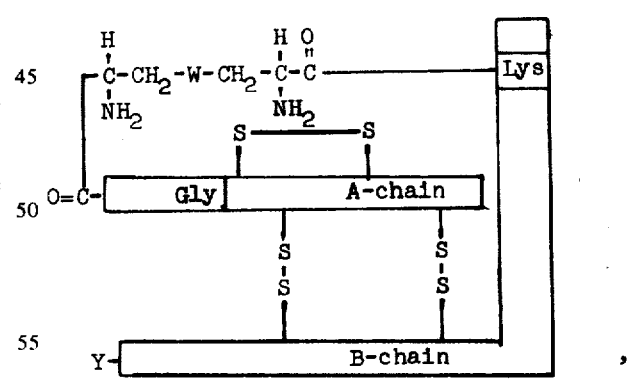

or an aforementioned analog therof, is obtained, and then subjecting the last-mentioned compound or analog to Edman degradation to remove the

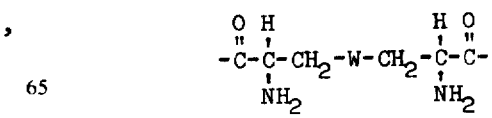

bridge therefrom.

2. An insulin compound of the formula

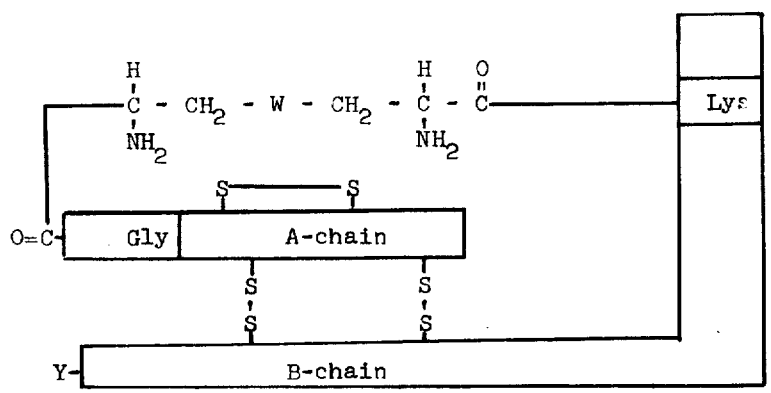

wherein —W— is —(CH$_2$)$_n$—, where $n$ is an integer from zero to four, or is —S—, —S—CH$_2$—, —CH$_2$—S—CH$_2$—, —SO$_2$—, —SO$_2$—CH$_2$—, or —CH$_2$—SO$_2$—CH$_2$—, and Y is hydrogen, alkanoyl having 1 to 4 carbon atoms, phenyl-alkanoyl having 1 to 3 carbon atoms in the alkanoyl portion, benzoyl, alkyloxy-carbonyl or aralkyloxy-carbonyl having 1 to 4 carbon atoms in the alkyl portion, or aminoacyl derived from a naturally-occurring α- or β-amino acid or from D-alanine.

* * * * *